(12) United States Patent
Liu et al.

(10) Patent No.: US 12,257,815 B2
(45) Date of Patent: Mar. 25, 2025

(54) SANDWICH COMPOSITE BOARD AND PREPARATION METHOD THEREOF

(71) Applicant: GONG YI VAN-RESEARCH INNOVATION COMPOSITE MATERIAL CO. LTD, Henan (CN)

(72) Inventors: Xizong Liu, Zhengzhou (CN); Jicheng Zhang, Zhengzhou (CN); Huina Dong, Zhengzhou (CN); Fengxia He, Zhengzhou (CN); Xiangming Gong, Zhengzhou (CN); Dongjia Yao, Zhengzhou (CN); Dongsheng Zhang, Zhengzhou (CN)

(73) Assignee: GONG YI VAN-RESEARCH INNOVATION COMPOSITE MATERIAL CO. LTD, Henan (CN)

( * ) Notice: Subject to any disclaimer, the term of this patent is extended or adjusted under 35 U.S.C. 154(b) by 273 days.

(21) Appl. No.: 18/014,954

(22) PCT Filed: Jul. 6, 2021

(86) PCT No.: PCT/CN2021/104768
§ 371 (c)(1),
(2) Date: Jan. 6, 2023

(87) PCT Pub. No.: WO2022/007797
PCT Pub. Date: Jan. 13, 2022

(65) Prior Publication Data
US 2023/0256725 A1 Aug. 17, 2023

(30) Foreign Application Priority Data
Jul. 7, 2020 (CN) .......................... 202010646043.2

(51) Int. Cl.
| | | |
|---|---|---|
| B29C 65/00 | (2006.01) | |
| B32B 5/18 | (2006.01) | |
| B32B 5/24 | (2006.01) | |
| B32B 17/06 | (2006.01) | |
| B32B 37/06 | (2006.01) | |
| B32B 37/10 | (2006.01) | |
| B32B 37/24 | (2006.01) | |

(52) U.S. Cl.
CPC ............... *B32B 37/24* (2013.01); *B32B 5/18* (2013.01); *B32B 5/245* (2013.01); *B32B 17/066* (2013.01); *B32B 37/06* (2013.01); *B32B 37/10* (2013.01); *B29C 65/00* (2013.01); *B32B 2250/03* (2013.01); *B32B 2250/40* (2013.01); *B32B 2260/023* (2013.01); *B32B 2260/046* (2013.01); *B32B 2264/303* (2020.08); *B32B 2266/126* (2016.11); *B32B 2309/02* (2013.01); *B32B 2309/04* (2013.01); *B32B 2309/12* (2013.01); *B32B 2451/00* (2013.01)

(58) Field of Classification Search
CPC ........ B32B 37/10; B32B 245/18; B29C 65/00
See application file for complete search history.

(56) References Cited

FOREIGN PATENT DOCUMENTS

| | | |
|---|---|---|
| CN | 205467583 U | 8/2016 |
| CN | 107620437 A | 1/2018 |
| CN | 10862319 | 10/2018 |
| CN | 109963822 A | 7/2019 |
| CN | 209353612 U | 9/2019 |
| CN | 110525005 A | 12/2019 |
| CN | 209794765 U | 12/2019 |
| CN | 110682622 A | 1/2020 |
| CN | 111320842 A | 6/2020 |
| CN | 111844996 A | 10/2020 |
| KR | 1020180114679 A | 10/2018 |
| WO | WO2017038769 A1 | 3/2017 |

OTHER PUBLICATIONS

PCT International Search Report and Written Opinion (w/ English translation) for corresponding PCT Application No. PCT/CN2021/104768, mailed on Oct. 12, 2021, 12 pages.
Chinese Office Action for corresponding CN App. No. 202010646043.2, 7 pages.

*Primary Examiner* — Philip C Tucker
*Assistant Examiner* — Nickolas R Harm
(74) *Attorney, Agent, or Firm* — Dority & Manning, P.A.

(57) ABSTRACT

The disclosure relates to a sandwich composite board and a preparation method thereof. The sandwich composite board includes, from top to bottom, an upper panel layer, a core material layer, and a lower panel layer, wherein the upper panel layer and the lower panel layer are glass or fiber reinforced resin-based composite sheets; and the core material layer is composed of an aerogel, a resin, and an expandable microsphere foaming agent. Method (1) includes: heating and melting the resin to obtain slurry A, cooling the same, adding the aerogel and the expandable microsphere foaming agent thereto, and uniformly mixing the same to obtain slurry B, then flat-laying the lower panel layer, coating or printing with the slurry B, then laying the upper panel layer and hot press molding the same. Method (2) includes: uniformly mixing an aerogel, a resin and an expandable microsphere foaming agent to obtain mixture A, placing the mixture A into a non-woven bag, sealing to obtain a core material B, flat-laying the lower panel layer, flat-laying the core material B, then laying the upper panel layer, and hot press molding the same.

11 Claims, No Drawings

SANDWICH COMPOSITE BOARD AND PREPARATION METHOD THEREOF

TECHNICAL FIELD

The present disclosure belongs to the technical field of composite board preparation, and specifically relates to a sandwich composite board and a preparation method thereof.

BACKGROUND

With the gradual improvement of people's living standards, the requirements for interior decoration are getting higher. Composite boards of various materials are becoming more and more popular in the application of interior decoration, and are widely used in doors and interior walls. However, at present, the overall cost of the composite boards meeting the application requirements is relatively high, and the composite boards are not fully mature in terms of their comprehensive properties such as fastness, compression resistance, impact resistance, thermal insulation and noise reduction. At present, composite boards are generally formed by sandwich boards, in which outer panels and a core material are bonded by glue, hot-pressed and dried, then cut and polished, and finally painted and formed. However, such composite boards are prone to cracking and delamination after being used for a period of time, and their properties of sound insulation, noise reduction and thermal insulation could not meet the actual application requirements. Therefore, the use of the composite boards in the architecture industry or decoration industry is limited to some extent.

It has been well recognized that noise pollution is the third major public hazard in today's society, and there are more and more noise sources. Noise would have an impact on human nervous system, cardiovascular system, digestive system, immune system, and even fetal development. Indoor noise pollution has become one of the widely concerned noise problems at present. Some relevant noise standards for residential, commercial, industrial or other areas have been made by the authority, which has put forward higher requirements for architecture and decorative materials of buildings. It has become a hot spot of current research and development that how to realize noise reduction in the architecture industry or decoration industry via updating or upgrading of new materials. It is desirable to design composite boards with good integrity and good thermal insulation, sound insulation and noise reduction, which would achieve application development in architecture industry, decoration industry or the like.

SUMMARY

The present disclosure aims to provide a sandwich composite board and a preparation method thereof.

To achieve the above purposes, the present disclosure provides technical solutions as follows.

A sandwich composite board, includes an upper panel layer, a core material layer, and a lower panel layer in sequence from top to bottom, wherein the upper panel layer and the core material layer are integrally formed, and the lower panel layer and the core material layer are integrally formed; the upper panel layer and the lower panel layer are glass or fiber-reinforced resin-based composite sheets; and the core material layer consists of 30-70 parts by mass of aerogel, 10-35 parts by mass of a resin, and 2-4 parts by mass of an expandable microsphere foaming agent.

In an embodiment, the glass is tempered glass, semi-tempered glass, ultra-white glass, float glass, coated glass, or film covered glass.

In an embodiment, fibers of the fiber-reinforced resin-based composite sheets are selected from the group consisting of glass fibers, carbon fibers, boron fibers, and aramid fibers; and the resin of the fiber-reinforced resin-based composite sheet is selected from the group consisting of a unsaturated polyester resin, a vinyl resin, a polyurethane resin, an epoxy resin, a polycarbonate resin, a polyamide resin, and a phenolic resin. The "fiber-reinforced resin-based composite sheet" in the present disclosure is commercially available or can be prepared according to prior art.

In an embodiment, the aerogel is selected from the group consisting of silicon dioxide aerogel, aluminum oxide aerogel, titanium dioxide aerogel, and zirconium dioxide aerogel.

In an embodiment, the resin of the core material layer is a thermosetting resin or a thermoplastic resin.

In an embodiment, the thermosetting resin is one of a phenolic resin, an urea-formaldehyde resin, a melamine-formaldehyde resin, an epoxy resin, a unsaturated resin, a polyurethane, or a polyimide; and the thermoplastic resin is one of a polyethylene resin, a polypropylene resin, a polycarbonate resin, a polyvinyl chloride resin, a polystyrene resin, a polyamide resin, a polyformaldehyde resin, a polyphenyl ether resin, or a polysulphone resin.

In an embodiment, the expandable microsphere foaming agent has a particle size of 10-50 μm.

The present disclosure also provides two methods for preparing the sandwich composite board.

Specifically, the first method includes the following steps of:
(1) adding the resin of the core material layer in a container and heating at 110-160° C. to allow the resin to melt and obtain slurry A, then cooling the slurry A to 25-70° C. by standing;
(2) adding the aerogel and the expandable microsphere foaming agent to the slurry A obtained in step (1), and mixing uniformly to obtain slurry B;
(3) flatly placing the lower panel layer, spreading the slurry B obtained in step (2) uniformly on the lower panel layer, and then placing the upper panel layer on the slurry B to obtain a sandwich composite layer; and
(4) hot-press molding the sandwich composite layer obtained in step (3) to obtain the sandwich composite board.

The second method includes the following steps of:
(1) adding the aerogel, the resin, and the expandable microsphere foaming agent according to the compositions of the core material layer in a container and mixing uniformly to obtain a mixture A;
(2) placing the mixture A obtained in step (1) into a nonwoven bag and sealing the bag to obtain a core material B;
(3) flatly placing the lower panel layer, spreading the core material B obtained in step (2) on the lower panel layer, and then placing the upper panel layer on the core material B to obtain a sandwich composite layer;
(4) hot-press molding the sandwich composite layer obtained in step (3) to obtain the sandwich composite board.

In an embodiment, in the hot-press molding of step (4) in the above first method and second method, the temperature is 100 to 180° C., the pressure is 2 to 5 MPa. and the time is 30 minutes to 8 hours.

The embodiments of the present disclosure would achieve the following benefits.

(1) The thickness of the sandwich composite board prepared according to the present disclosure is controllable. The sandwich composite boards with different thicknesses can be prepared by adjusting the spreading thickness of the slurry B or adjusting the amount of the mixture A in the nonwoven bag.

(2) The density of the sandwich composite board prepared according to the present disclosure is controllable. The density of the sandwich composite board can be significantly reduced by adding the expandable microsphere foaming agent. The density of the sandwich composite board can be controlled by adjusting the amount of the expandable microsphere foaming agent.

(3) The integrity of the sandwich composite board prepared according to the present disclosure is good. The sandwich composite board is integrated by hot-press molding. If the upper panel layer and the lower panel layer are the fiber-reinforced resin-based composite sheets, they can be integrally solidified and formed with the core material layer under the condition of hot-pressing, and the interlayer bonding is good. If the upper panel layer and the lower panel layer are glass layers, since glass is partially softened and fused with the resin in the core material layer under the condition of hot-pressing, it would ensure good integrity between the layers, and avoid separation or peeling of the layers during use. In addition, the mixture A is placed in a nonwoven bag and then subject to hot-press molding, which would avoid dropping of powder or damaging of corner, and ensure the integrity of the product. When the mixture A is directly placed between the upper panel layer and the lower panel layer for hot-press molding, dropping of powder or damaging of corner would occur.

(4) The sandwich composite board prepared according to the present disclosure has good effects of thermal insulation, sound insulation and noise reduction. Aerogel and an expandable microsphere foaming agent are used as a sandwich structure in the present disclosure. The expandable microsphere foaming agent would possess porosity after foaming, so that the resulting foam would have certain thermal insulation and sound insulation properties, which would be maintained after being combined with the aerogel.

(5) The sandwich composite board prepared according to the present disclosure has good properties of thermal insulation, sound insulation and noise reduction, which would meet the growing social requirements, and could be widely used in architecture or decoration industry or the like.

DETAILED DESCRIPTION

The present disclosure will now be described in detail with reference to the specific examples. It should be understood that examples described herein are only for explaining the present disclosure, and not intended to limit the present disclosure.

Example 1

A sandwich composite board includes an upper panel layer, a core material layer and a lower panel layer in sequence from top to bottom. The upper panel layer and the core material layer are integrally formed, and the lower panel layer and the core material layer are integrally formed. The upper panel layer and the lower panel layer are carbon fiber-reinforced phenolic resin-based composite sheets. The core material layer consists of 60 parts by mass of silicon dioxide aerogel, 35 parts by mass of a polyethylene resin, and 4 parts by mass of an expandable microsphere foaming agent, i.e., EM406 (with average diameter of 20 μm, which is commercially available from NOF CORPORATION).

The method for preparing the above sandwich composite board includes the following steps of:

(1) adding polyethylene resin powder in a container and heating at 120° C. to allow it to melt and obtain slurry A, then cooling the slurry A to 40° C. by standing;

(2) adding silicon dioxide aerogel and the expandable microsphere foaming agent, i.e., EM406, to the slurry A obtained in step (1), and mixing uniformly to obtain slurry B;

(3) flatly placing the lower panel layer, i.e., one carbon fiber-reinforced phenolic resin-based composite sheet, spreading the slurry B obtained in step (2) uniformly on the lower panel layer, and then placing the upper panel layer, i.e., the other carbon fiber-reinforced phenolic resin-based composite sheet, on the slurry B to obtain a sandwich composite layer; and (4) hot-press molding the sandwich composite layer obtained in step (3) at the temperature of 150° C. and the pressure of 4 MPa for 1 hour, to obtain the sandwich composite board.

Example 2

A sandwich composite board includes an upper panel layer, a core material layer and a lower panel layer in sequence from top to bottom. The upper panel layer and the core material layer are integrally formed, and the lower panel layer and the core material layer are integrally formed. The upper panel layer and the lower panel layer are tempered glass panels. The core material layer consists of 50 parts by mass of aluminum oxide aerogel, 25 parts by mass of a phenolic resin and 4 parts by mass of an expandable microsphere foaming agent, i.e., EHM401 (with average diameter of 60 μm, which is commercially available from NOF CORPORATION).

The method for preparing the above sandwich composite board includes the following steps of:

(1) adding phenolic resin powder in a container and heating at 130° C. to allow it to melt and obtain slurry A, then cooling the slurry A to 30° C. by standing;

(2) adding aluminum oxide aerogel and the expandable microsphere foaming agent, i.e., EHM401, to the slurry A obtained in step (1), and mixing uniformly to obtain slurry B;

(3) flatly placing the lower panel layer, i.e., one tempered glass panel, spreading the slurry B obtained in step (2) uniformly on the lower panel layer, and then placing the upper panel layer, i.e., the other tempered glass panel, on the slurry B to obtain a sandwich composite layer; and (4) hot-press molding the sandwich composite layer obtained in step (3) at the temperature of 130° C. and the pressure of 3 MPa for 50 minutes, to obtain the sandwich composite board.

Example 3

A sandwich composite board includes an upper panel layer, a core material layer and a lower panel layer in sequence from top to bottom. The upper panel layer and the core material layer are integrally formed, and the lower panel layer and the core material layer are integrally formed. The upper panel layer and the lower panel layer are coated glass panels. The core material layer consists of 65 parts by mass of titanium dioxide aerogel, 35 parts by mass of an epoxy resin, and 4 parts by mass of an expandable microsphere foaming agent, i.e. TEP-160 (with average diameter of 80 μm, which is commercially available from NOF CORPORATION).

The method for preparing the above sandwich composite board includes the following steps of:
(1) adding epoxy resin powder in a container and heating at 150° C. to allow it to melt and obtain slurry A, then cooling the slurry A to 50° C. by standing;
(2) adding titanium dioxide aerogel and the expandable microsphere foaming agent, i.e., TEP-160, to the slurry A obtained in step (1), and mixing uniformly to obtain slurry B;
(3) flatly placing the lower panel layer, i.e., one coated glass panel, spreading the slurry B obtained in step (2) uniformly on the lower panel layer, and then placing the upper panel layer, i.e., the other coated glass panel, on the slurry B to obtain a sandwich composite layer; and
(4) hot-press molding the sandwich composite layer obtained in step (3) at the temperature of 160° C. and the pressure of 5 MPa for 40 minutes, to obtain the sandwich composite board.

Example 4

A sandwich composite board includes an upper panel layer, a core material layer and a lower panel layer in sequence from top to bottom. The upper panel layer and the core material layer are integrally formed, and the lower panel layer and the core material layer are integrally formed. The upper panel layer and the lower panel layer are glass fiber-reinforced epoxy resin-based composite sheets. The core material layer consists of 40 parts by mass of zirconium dioxide aerogel, 20 parts by mass of a polyamide resin, and 2 parts by mass of an expandable microsphere foaming agent, i.e., EM406 (with average diameter of 20 μm, which is commercially available from NOF CORPORATION).

The method for preparing the above sandwich composite board includes the following steps of:
(1) adding polyamide resin powder in a container and heating at 140° C. to allow it to melt and obtain slurry A, then cooling the slurry A to 45° C. by standing;
(2) adding zirconium dioxide aerogel and the expandable microsphere foaming agent, i.e., EM406 to the slurry A obtained in step (1), and mixing uniformly to obtain slurry B;
(3) flatly placing the lower panel layer, i.e., one glass fiber-reinforced epoxy resin-based composite sheet, spreading the slurry B obtained in step (2) uniformly on the lower panel layer, and then placing the upper panel layer, i.e., the other glass fiber-reinforced epoxy resin-based composite sheet, on the slurry B to obtain a sandwich composite layer; and
(4) hot-press molding the sandwich composite layer obtained in step (3) at the temperature of 140° C. and the pressure of 3 MPa for 40 minutes, to obtain the sandwich composite board.

Example 5

A sandwich composite board includes an upper panel layer, a core material layer and a lower panel layer in sequence from top to bottom. The upper panel layer and the core material layer are integrally formed, and the lower panel layer and the core material layer are integrally formed. The upper panel layer and the lower panel layer are glass fiber-reinforced polycarbonate resin-based composite sheets. The core material layer consists of 30 parts by mass of silicon dioxide aerogel, 20 parts by mass of a phenolic resin, and 3 parts by mass of an expandable microsphere foaming agent, i.e., EM406 (with average diameter of 20 μm, which is commercially available from NOF CORPORATION).

The method for preparing the above sandwich composite board includes the following steps of:
(1) adding silicon dioxide aerogel, phenolic resin powder, and the expandable microsphere foaming agent EM406 in a container, and mixing uniformly to obtain a mixture A;
(2) placing the mixture A obtained in step (1) into a nonwoven bag and sealing the bag to obtain a core material B;
(3) flatly placing the lower panel layer, i.e., one glass fiber-reinforced polycarbonate resin-based composite sheet, and spreading the core material B obtained in step (2) on the lower panel layer, and then placing the upper panel layer, i.e., the other glass fiber-reinforced polycarbonate resin-based composite sheet, on the core material B to obtain a sandwich composite layer;
(4) hot-press molding the sandwich composite layer obtained in step (3) at the temperature of 150° C. and the pressure of 4 MPa for 1 hour, to obtain the sandwich composite board.

Example 6

A sandwich composite board includes an upper panel layer, a core material layer and a lower panel layer in sequence from top to bottom. The upper panel layer and the core material layer are integrally formed, and the lower panel layer and the core material layer are integrally formed. The upper panel layer and the lower panel layer are aramid fiber-reinforced polyamide resin-based composite sheets. The core material layer consists of 50 parts by mass of aluminum oxide aerogel, 35 parts by mass of a polystyrene resin, and 4 parts by mass of an expandable microsphere foaming agent, i.e., EM406 (with average diameter of 20 μm, which is commercially available from NOF CORPORATION).

The method for preparing the above sandwich composite board includes the following steps of:
(1) adding aluminum oxide aerogel, polystyrene resin powder, and the expandable microsphere foaming agent EM406 in a container, and mixing uniformly to obtain a mixture A;
(2) placing the mixture A obtained in step (1) into a nonwoven bag and sealing the bag to obtain a core material B;
(3) flatly placing the lower panel layer, i.e., one aramid fiber-reinforced polyamide resin-based composite sheet, and spreading the core material B obtained in step (2) on the lower panel layer, and then placing the upper panel layer, i.e., the other aramid fiber-reinforced polyamide resin-based composite sheet, on the core material B to obtain a sandwich composite layer;
(4) hot-press molding the sandwich composite layer obtained in step (3) at the temperature of 130° C. and the pressure of 3 MPa for 50 minutes, to obtain the sandwich composite board.

Example 7

A sandwich composite board includes an upper panel layer, a core material layer and a lower panel layer in sequence from top to bottom. The upper panel layer and the core material layer are integrally formed, and the lower panel layer and the core material layer are integrally formed. The upper panel layer and the lower panel layer are tempered glass. The core material layer consists of 45 parts by mass of titanium dioxide aerogel, 25 parts by mass of an epoxy resin, and 4 parts by mass of an expandable microsphere foaming agent, i.e., EHM401 (with average diameter of 60 μm, which is commercially available from NOF CORPORATION).

The method for preparing the above sandwich composite board includes the following steps of:
(1) adding titanium dioxide aerogel, epoxy resin powder, and the expandable microsphere foaming agent EHM401 in a container and mixing uniformly to obtain a mixture A;
(2) placing the mixture A obtained in step (1) into a nonwoven bag and sealing the bag to obtain a core material B;
(3) flatly placing the lower panel layer, i.e., one tempered glass panel, and spreading the core material B obtained in step (2) on the lower panel layer, and then placing the upper panel layer, i.e., the other tempered glass panel, on the core material B to obtain a sandwich composite layer;
(4) hot-press molding the sandwich composite layer obtained in step (3) at the temperature of 160° C. and the pressure of 3 MPa for 40 minutes, to obtain the sandwich composite board.

What is claimed is:

1. A sandwich composite board, comprising an upper panel layer, a core material layer and a lower panel layer in sequence from top to bottom, wherein the upper panel layer and the core material layer are integrally formed, and the lower panel layer and the core material layer are integrally formed; the upper panel layer and the lower panel layer are glass or fiber-reinforced resin-based composite sheets; and the core material layer consists of 30-70 parts by mass of aerogel, 10-35 parts by mass of a resin, and 2-4 parts by mass of an expandable microsphere foaming agent.

2. The sandwich composite board of claim 1, wherein the glass is selected from the group consisting of tempered glass, semi-tempered glass, ultra-white glass, float glass, coated glass, and film covered glass.

3. The sandwich composite board of claim 1, wherein fibers of the fiber-reinforced resin-based composite sheets are selected from the group consisting of glass fibers, carbon fibers, boron fibers, and aramid fibers; and the resin of the fiber-reinforced resin-base composite sheet is selected from the group consisting of an unsaturated polyester resin, a vinyl resin, a polyurethane resin, an epoxy resin, a polycarbonate resin, a polyamide resin, and a phenolic resin.

4. The sandwich composite board of claim 1, wherein the aerogel is selected from the group consisting of silicon dioxide aerogel, aluminum oxide aerogel, titanium dioxide aerogel, and zirconium dioxide aerogel.

5. The sandwich composite board of claim 1, wherein the resin of the core material layer is a thermosetting resin or a thermoplastic resin.

6. The sandwich composite board of claim 5, wherein the thermosetting resin is selected from the group consisting of a phenolic resin, a urea-formaldehyde resin, a melamine-formaldehyde resin, an epoxy resin, an unsaturated resin, a polyurethane, and a polyimide; and the thermoplastic resin is selected from the group consisting of a polyethylene resin, a polypropylene resin, a polycarbonate resin, a polyvinyl chloride resin, a polystyrene resin, a polyamide resin, a polyformaldehyde resin, a polyphenyl ether resin, and a polysulphone resin.

7. The sandwich composite board of claim 1, wherein the expandable microsphere foaming agent has a particle size of 10-50 μm.

8. A method for preparing the sandwich composite board of claim 1, comprising the steps of:
(1) adding the resin of the core material layer in a container and heating at 110-160° C. to allow the resin of the core material layer to melt and obtain slurry A, then cooling the slurry A to 25-70° C. by standing;
(2) adding the aerogel and the expandable microsphere foaming agent to the slurry A obtained in step (1), and mixing uniformly to obtain slurry B;
(3) flatly placing the lower panel layer, spreading the slurry B obtained in step (2) uniformly on the lower panel layer, and then placing the upper panel layer on the slurry B to obtain a sandwich composite layer; and
(4) hot-press molding the sandwich composite layer obtained in step (3) to obtain the sandwich composite board.

9. The method of claim 8, wherein the hot-press molding of step (4) is performed at a temperature of 100-180° C., the pressure is 2-5 MPa, and the time is 30 minutes-8 hours.

10. A method for preparing the sandwich composite board of claim 1, comprising the steps of:
(1) adding the aerogel, the resin, and the expandable microsphere foaming agent according to compositions of the core material layer in a container and mixing uniformly to obtain a mixture A;
(2) placing the mixture A obtained in step (1) into a nonwoven bag and sealing the nonwoven bag to obtain a core material B;
(3) flatly placing the lower panel layer, spreading the core material B obtained in step (2) on the lower panel layer, and then placing the upper panel layer on the core material B to obtain a sandwich composite layer; and
(4) hot-press molding the sandwich composite layer obtained in step (3) to obtain the sandwich composite board.

11. The method of claim 10, wherein the hot-press molding of step (4) is performed at a temperature of 100-180° C., a pressure of 2-5 MPa, and a time of 30 minutes-8 hours.

* * * * *